US010890521B2

(12) United States Patent
Wieneke et al.

(10) Patent No.: US 10,890,521 B2
(45) Date of Patent: Jan. 12, 2021

(54) METHOD OF TRACKING A PLURALITY OF POINT-SHAPED OBJECTS IN A THREE-DIMENSIONAL SPACE

(71) Applicant: LaVision GmbH, Goettingen (DE)

(72) Inventors: Bernhard Wieneke, Goettingen (DE);
Andreas Schröder, Goettingen (DE);
Arne Henning, Goettingen (DE);
Matteo Novara, Goettingen (DE);
Daniel Schanz, Goettingen (DE)

(73) Assignee: LAVISION GMBH, Goettingen (DE)

( * ) Notice: Subject to any disclaimer, the term of this patent is extended or adjusted under 35 U.S.C. 154(b) by 161 days.

(21) Appl. No.: 16/008,326

(22) Filed: Jun. 14, 2018

(65) Prior Publication Data

US 2019/0139235 A1 May 9, 2019

(30) Foreign Application Priority Data

Jun. 14, 2017 (DE) .......................... 10 2017 113 194

(51) Int. Cl.
*G01N 15/14* (2006.01)
*G01P 5/00* (2006.01)
(Continued)

(52) U.S. Cl.
CPC ....... *G01N 15/1463* (2013.01); *G01B 11/002* (2013.01); *G01N 15/1429* (2013.01);
(Continued)

(58) Field of Classification Search
CPC combination set(s) only.
See application file for complete search history.

(56) References Cited

U.S. PATENT DOCUMENTS

| 5,610,703 A | 3/1997 | Raffel et al. |
| 7,382,900 B2 | 6/2008 | Wieneke |

(Continued)

FOREIGN PATENT DOCUMENTS

| DE | 10 2009 029 321 A1 | 5/2011 |
| DE | 10 2009 009 551 B4 | 2/2013 |

(Continued)

OTHER PUBLICATIONS

Deutsche Patent-und Markenamt, "Prüfungsbescheid, Aktenzeichen 10 2017 113 194.9" (Mar. 7, 2018) (Year: 2018).*

(Continued)

*Primary Examiner* — David N Werner
(74) *Attorney, Agent, or Firm* — Thomas | Horstemeyer, LLP

(57) ABSTRACT

For tracking a plurality of objects in a three-dimensional space two-dimensional pictures objects are recorded with two black and white cameras out of two different imaging directions. Both first pictures and second pictures of the two cameras are simultaneously exposed at two points in time in equal ways, a point in time at which the second pictures are exposed for a first time following to a point in time at which the first pictures are exposed for a last time at a much shorter interval than the two points in time of exposure of both the first and second pictures. First and second distributions of real positions of the individual objects are determined from their images in the first and second pictures, respectively; and temporally resolved trajectories of the individual objects in the three-dimensional space are determined from the first and second distributions of real positions.

18 Claims, 4 Drawing Sheets

(51) Int. Cl.
*G01P 5/20* (2006.01)
*G01B 11/00* (2006.01)
*G06K 9/62* (2006.01)
*G06T 7/70* (2017.01)
*G01N 21/17* (2006.01)
*G06T 7/292* (2017.01)
*H04N 5/04* (2006.01)
*H04N 5/235* (2006.01)
*H04N 5/247* (2006.01)

(52) U.S. Cl.
CPC ..... *G01N 15/1456* (2013.01); *G01N 15/1459* (2013.01); *G01N 15/1475* (2013.01); *G01P 5/001* (2013.01); *G01P 5/20* (2013.01); *G06K 9/6203* (2013.01); *G06T 7/70* (2017.01); *G01N 2015/144* (2013.01); *G01N 2021/1791* (2013.01); *G01N 2201/0696* (2013.01); *G01N 2201/0697* (2013.01); *G01N 2201/0698* (2013.01); *G06T 7/292* (2017.01); *G06T 2207/10052* (2013.01); *G06T 2207/10152* (2013.01); *G06T 2207/30241* (2013.01); *H04N 5/04* (2013.01); *H04N 5/2354* (2013.01); *H04N 5/247* (2013.01)

(56) References Cited

U.S. PATENT DOCUMENTS

| | | |
|---|---|---|
| 8,542,882 B2 | 9/2013 | Wieneke |
| 9,282,266 B2 | 3/2016 | Geisler |
| 9,733,267 B2 | 8/2017 | Wieneke et al. |
| 2005/0062954 A1 | 3/2005 | Wieneke |
| 2012/0140231 A1* | 6/2012 | Knox ................. H01L 29/7786 356/442 |
| 2012/0194805 A1* | 8/2012 | Ness .................. G01N 21/553 356/213 |
| 2018/0284020 A1* | 10/2018 | Vauclin ................ G01N 21/31 |

FOREIGN PATENT DOCUMENTS

| | | |
|---|---|---|
| DE | 10 2012 112 118 A1 | 6/2014 |
| DE | 10 2013 104 060 A1 | 10/2014 |
| WO | 2014/191461 A1 | 12/2014 |

OTHER PUBLICATIONS

Deutsche Patent-und Markenamt, "Prüfungsbescheid, Aktenzeichen 10 2017 113 194.9" (English-language machine translation) (Mar. 7, 2018) (Year: 2018).*
C.E. Willert, M. Gharib: Digital particle image velocimetry, Experiments in Fluids 10, 1991, 181-193.
Richard D. Keane ,Ronald J. Adrian: Optimization of particle image velocimeters. Part I: Double pulsed systems, Meas Sci. Technol. 1, 1990, 1202-1215.
Jerry Westerweel et al.: Particle Image Velocimetry for Complex and Turbulent Flows, Annu. Rev. Fluid Mech. 2013. 45:409-436.
W.L. Lim et al.: Improving the Dynamic Range of Particle Tracking Velocimetry Systems, Experiments and Fluids 17 (1994), 232-289.
Ronald J. Adrian: Particle-Imaging Techniques for Experimental Fluid Mechanics, Annu. Rev. Fluid Mech. 1991. 23:261-304.

* cited by examiner

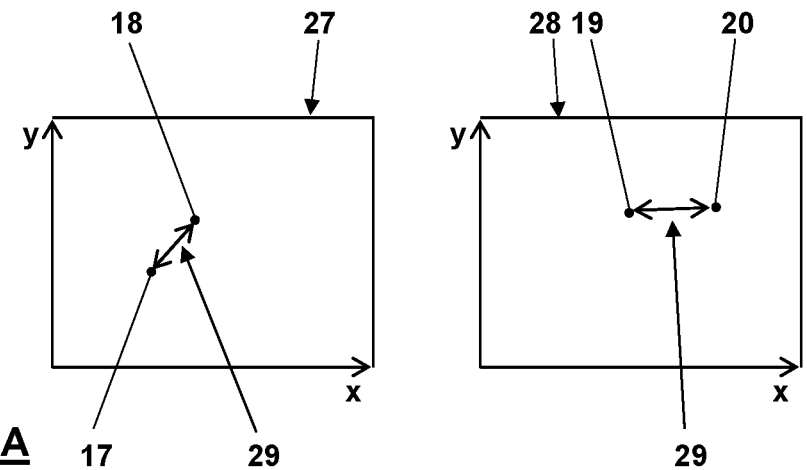
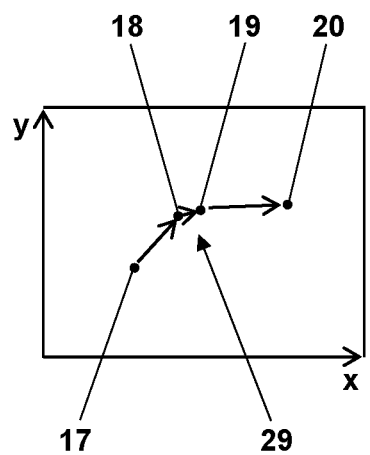
Fig. 4A
Fig. 4B
Fig. 4C

METHOD OF TRACKING A PLURALITY OF POINT-SHAPED OBJECTS IN A THREE-DIMENSIONAL SPACE

CROSS REFERENCE

The present utility patent application claims priority to German patent application DE 10 2017 113 194.9 filed on Jun. 14, 2017 and entitled "Verfahren zum Verfolgen einer Vielzahl von punktförmigen Objekten im Raum".

FIELD

The present invention relates to a method of tracking a plurality of point-shaped objects in a three-dimensional space. More particular, the present invention relates to a method in which two-dimensional pictures of a plurality of point-shaped objects are taken out of different imaging directions with several black and white cameras, the pictures of the several black and white cameras being exposed simultaneously and at least two consecutive pictures of each of the several black and white cameras being exposed, in which real positions of the individual objects in the three-dimensional space are determined from their images in the respective simultaneously exposed pictures, and in which the real positions belonging to individual objects are interrelated to determine a temporally resolved trajectory of the individual objects in the three-dimensional space.

The tracked objects may particularly be objects moving with a flow. Then, from the temporally resolved trajectories of the objects not only their velocities and accelerations may be determined but also velocity fields, acceleration fields and pressure fields of the respective flow. The point-shaped objects are, for example, small particles, gas bubbles or droplets of liquids which scatter light diffusely and which may thus be imaged with a camera in such a way that images of the objects are found in the pictures of the cameras. With small objects, these images are point-shaped or quasi point-shaped independently on the actual shape of the objects.

BACKGROUND OF THE INVENTION

International patent application publication WO 2014/191461 A1 and corresponding US patent specification U.S. Pat. No. 9,733,267 B2 disclose a method of ascertaining a changing spatial distribution of particles at multiple points in time which follow one another at intervals. For each of these points in time, the following steps are executed. Real two-dimensional pictures of the particles are recorded with different mapping functions. An estimated spatial distribution of the particles of provided, and virtual two-dimensional pictures of the estimated spatial distribution are calculated applying different mapping functions. Then, differences between the virtual and the real two-dimensional pictures are determined; and the estimated spatial distribution of the particles is varied for reducing the differences to obtain a spatial distribution approximated to the actual spatial distribution of the particles. The estimated spatial distribution of the particles is provided in that the locations of the individual particles in a spatial distribution approximated for another point in time are shifted dependently on how the locations of the individual particles have changed between at least two spatial distributions approximated for at least two prior points in time. In this way, the real positions of the individual particles in the different approximated spatial distributions are interrelated to each other. Thus, temporally resolved trajectories of the particles in the three-dimensional space are determined.

In applying the method known from WO 2014/191461 A1 and U.S. Pat. No. 9,733,267 B2 to determine the velocity, acceleration and pressure fields of fast flows, the real pictures of the particles have to be recorded one after the other very quickly. Otherwise the pictures recorded for the different points in time will no longer show the same particles, or the spacing between two images of a same particle is too large to determine the trajectory. The frequency at which more than two pictures can be recorded one after the other is, however, generally limited to the picture frequency of the cameras used. Cameras with a high picture frequency are expensive. In order to image the plurality of objects out of several imaging directions, several such expensive cameras have to be used.

German patent application publication DE 10 2012 112 118 A1 and corresponding US patent specification U.S. Pat. No. 9,282,266 B2 disclose a special use of a picture sensor of a camera for recording quickly successive pictures. In this use, the light intensities registered by pairs of neighboring light sensors are added up to allow for recording two pictures at a half spatial resolution in a quick succession to which a third picture at a full spatial resolution may follow before the two interleaved pictures of the half resolution are read out of the picture sensor. This special use is possible with certain but only few commercially available picture sensors. Further, this special use has the disadvantage that the two first pictures, at least in one direction, only have the half spatial resolution, and that in total only three pictures may be recorded in a quick succession.

German patent application publication DE 10 2013 104 060 A1 discloses a method of tracking at least one fast moving object in which several picture sensors are synchronously exposed multiple times to record n congruent partial pictures in n separated spectral ranges during one exposure time, wherein n is at least 2. At m consecutive points in time the object is illuminated with m light pulses of different spectral compositions, m being higher than n and at least one of the m light pulses has a spectral composition with essential components in more than one of the separated spectral ranges. Thus, m images of the objects may be temporally separated due to their different light intensities in the partial pictures recorded with the different picture sensors.

It is a disadvantage of the method known from DE 10 2013 104 060 A1 that the picture sensors have to be exactly aligned with regard to each other. As an alternative to three separate picture sensors, an RGB camera may be used. In an RGB camera, however, the picture sensors associated with the colors red, green and blue are not exactly congruent but slightly offset with regard to each other. Further, the quickly successive illuminations of the object with light of different spectral compositions one after the other are complicated.

U.S. Pat. No. 5,610,703 A discloses to illuminate particles arranged in an essentially two-dimensional light section with consecutive light pulses such that at maximum one light pulse coincides with each picture of a camera used. Thus, each particle only has one image in each picture of the light section. Further, this US patent discloses to direct two light pulses onto the particles in the light section during each picture of the camera so that each picture comprises two images of each particle. Each of these pictures may then be evaluated by calculating an auto-correlation function to determine shifts of the images between the two illuminations. On the other hand, shifts of the images between the pictures may be determined by calculating a cross-correlation function between these pictures.

Jerry Westerweel et al.: Particle Picture Velocimetry for Complex and Turbulent Flows, Annu. Rev. Fluid Mech. 2013. 45:409-436 disclose triple-pulse PIV (Particle Picture Velocimetry). In triple-pulse PIV a single additional light pulse is added to conventional double pulsed PIV.

W. L. Lim et al.: Improving the Dynamic Range of Particle Tracking Velocimetry Systems, Experiments and Fluids 17 (1994), 232-289 disclose the use of multiple frames and multiple exposures on a single frame to extend the dynamic range of particle picture velocimetry (PTV).

Ronald J. Adrian: Particle-Imaging Techniques for Experimental Fluid Mechanics, Annu. Rev. Fluid Mech. 1991. 23:261-304 discloses different pulse-coding and framing methods including multi-frame/single pulse, multi-frame/double pulse and multi-frame/multi-pulse.

There still is a need of a method of tracking a plurality of point-shaped objects in a three-dimensional space which, at a low effort with regard to the apparatuses used, is also suitable for tracking a plurality of very quickly moving point-shaped objects in the three-dimensions space to determine not only velocity fields but also acceleration and pressure fields of a fast flow at a high precision.

SUMMARY OF THE INVENTION

The present invention relates to method of tracking a plurality of point-shaped objects in a three-dimensional space. The method comprises recording two-dimensional pictures of the plurality of objects by means of at least two black and white cameras out of at least two different imaging directions. In this step of recording at least first and second pictures of the at least two black and white cameras are each exposed at at least two points in time in equal ways; the first pictures are exposed simultaneously for a first time at a first point in time and for a last time at a second point in time following to the first point in time at a first inner-picture interval of time; the second pictures are exposed simultaneously for a first time at a third point in time and for a last time at a fourth point in time following to the third point in time at a second inner-picture interval of time; and the third point in time follows to the second point in time at an inter-picture interval of time of not more than 50% of the first inner-picture interval of time and of not more than 50% of the second inner-picture interval of time. The method further comprises determining a first distribution and a second distribution of real positions of the individual objects of the plurality of objects in the three-dimensional space from their images in the first pictures and from their images in the second pictures, respectively; and determining temporally resolved trajectories of the individual objects of the plurality of objects in the three-dimensional space from the determined first and second distributions of the real positions of the individual objects. In the step of determining the temporally resolved trajectories of the individual objects of the plurality of objects in the three-dimensional space different real positions of the same individual objects of the plurality of objects in the first distribution are interrelated; different real positions of the same individual objects of the plurality of objects in the second distribution are interrelated; and different real positions of the same individual objects of the plurality of objects in the first and second distributions are interrelated.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 3A and FIG. 3B are flow charts showing sequences of steps of two embodiments of the method according to the invention; and.

FIG. 4A, FIG. 4B and FIG. 4C illustrate the steps of interrelating real positions of an individual object in a three-dimensional space which the object has at points in time of illuminations during two consecutive pictures of each camera (FIG. 4 A and FIG. 4 B) to determine a temporally resolved trajectory of the object (FIG. 4 C).

DETAILED DESCRIPTION

Figure 1:
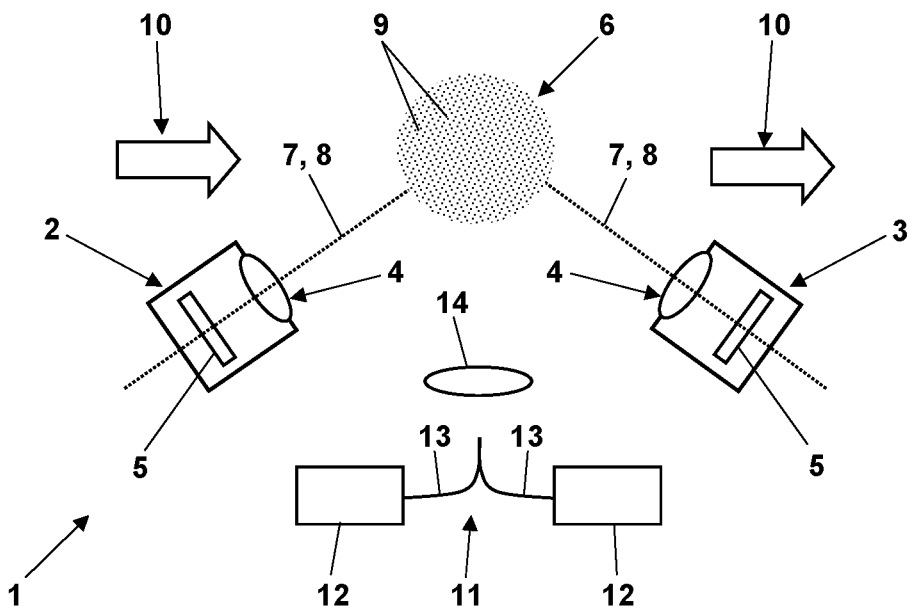
FIG. 1 illustrates a measuring setup for recording two-dimensional pictures of a plurality of objects out of several imaging directions using several synchronized cameras.

In a method according to the invention of tracking a plurality of point-shaped objects, two-dimensional pictures of the plurality of the objects are taken or recorded with several cameras out of several imaging directions. The cameras are black and white or monochrome cameras. Even if in the following cameras are mentioned without indicating that they are black and white or monochrome cameras, only such black and white cameras are meant as long as nothing else is explicitly indicated. The term black and white cameras or monochrome cameras does not mean that no color or wavelength filter may be arranged in front of the cameras. Instead such a filter may be used to, for example, suppress background light over monochromatic light by which the objects are purposefully illuminated. Even in this case, however, the several cameras do not serve for spectrally resolving the light from the plurality of objects.

Typically, the several cameras by which the pictures of the objects are recorded out of different imaging directions are arranged at different locations, i.e. separated spatially. In principle, however, the method according to the invention may also be carried out using a so-called Lightfield camera. A Lightfield camera comprises an array of objective lenses for imaging or mapping a measurement volume out of slightly different imaging directions onto different areas of a picture sensor. Each of these areas of the picture sensor and the associated objective lens of the array of objective lenses is regarded as being a camera, here.

The cameras are synchronized with regard to the succession of their pictures at least to such an extent that the pictures of the different cameras are always exposed simultaneously. At least two consecutive pictures of each of the cameras are exposed at intervals in time. Particularly, each of the at least two consecutive pictures of each camera is at least exposed twice at an inner-picture interval of time, and it may also be exposed at at least one further point in time, i.e. at least trice at three points in time at inner-picture intervals of time.

Even for tracking objects which move very fast in a three-dimensional space, the method according to the invention may be carried out with low cost or value for money cameras which have a comparatively low picture frequency. In principle, the method according to the invention could even be carried out with cameras which only allows for recording two consecutive pictures. In any case, it is favorable if the cameras only have short dead times during picture changes between their at least two pictures, in which they do not register incident light.

In the method according to the invention, real positions of the individual objects in the three-dimensional space are determined from their image in the respective simultaneously exposed pictures. The real positions are determined for essentially all images of the objects in the pictures recorded out of the different imaging directions. As each of the at least two pictures of the cameras has been exposed at least twice, a distribution of real positions of the individual objects in the three-dimensional space is determined from the images of the objects in the pictures of the cameras, which includes more real positions than individual objects present. Particularly, the number of the real positions is at least about two times the number of the individual objects present. The real positions belonging to one of the objects are then interrelated to determine a temporally resolved trajectory of the respective object in the three-dimensional space. This step of determining includes interrelating different positions of each object within each of the distributions.

Surprisingly, it has been found that not only double exposed pictures of essentially two-dimensional light sections in which the images of objects directly correspond to a position of the objects in the respective light section may be evaluated but that this is also possible for multiple exposed pictures of objects in a volume which have been recorded out of different imaging directions. By means of the multiple exposure of the pictures of the cameras, objects may be tracked which quickly alter their positions because they, for example, move with a fast flow, even when using cameras with standard picture frequency. The extension of the sequence of the exposures beyond one picture change of the cameras provides an additional temporal information as the images of the objects in the previously recorded pictures correspond to prior real positions of the objects along their trajectories than the images in the pictures recorded later.

It is to be understood that the objects may only have such a high density in the respective volume and their images may only have such a high density in the pictures recorded that real positions of the objects in the three-dimensional space can be determined from the images and that these real positions in the three-dimensional space can be interrelated. By using suitable methods for determining the real positions of the objects in the in the three-dimensional space and for interrelating them to determine the trajectories of the objects, as they are indicated in the following, however, sufficiently high densities of the objects in the volume are possible to, for example, spatially resolve even complex flows with regard to their velocity, acceleration and pressure fields. Particularly, particle densities of more than 0.05 ppp (particles per pixel of the picture sensors of the cameras) are possible.

In the method according to the invention, real positions of the objects in the space are determined for essentially all images of the objects in the simultaneously multiple exposed pictures, and only these real positions in the space are interrelated to determine the trajectories each belonging to one of the objects. In other words, the images of the objects are not yet interrelated, neither within the multiple exposed pictures nor between the pictures. This does, however, not exclude that information acquired from interrelating the real positions to determine the trajectories of the individual objects is fed back to the step of determining the real positions of the individual objects from their images in the pictures. Instead such information may be used to determine these real positions at a higher precision. It is also possible to then feed back these real positions of higher precision to the step of interrelating, particularly to increase the security in associating different real positions with one object.

In the method according to the invention, the pictures of the cameras are exposed at the at least two points in time at an interval in time in a same way so that the images of one and the same real object in the individual pictures may not be differentiated. Thus, it is not possible to conclude on the points in time of exposure of the cameras which resulted in the different images of the individual objects. Instead, in the method according to the invention, differentiating the images with regard to different times and objects generally occurs by interrelating the real positions each belonging to one of the objects to a trajectory of the respective object in the three-dimensional space. This step of interrelating does not require that the real positions belonging to the respective one of the objects can be differentiated from the real positions of the other objects in the three-dimensional space prior to that step. Instead, the step of interrelating of the method according to the invention includes the analysis which of the real positions are associated with which of the individual objects.

In the method according to the invention, third and also further pictures of the at least two black and white cameras may each exposed at at least two points in time in equal ways. The third pictures are exposed simultaneously for a first time at a fifth point in time and for a last time at a sixth point in time following to the fifth point in time at a third inner-picture interval of time, wherein the fifth point in time follows to the fourth point in time at the inter-picture interval of time of not more than 50% of the first inner-picture interval of time, of not more than 50% of the second inner-picture interval of time and of not more than 50% of the third inner-picture interval of time. With the third or even further pictures it becomes clear that the points in time at which the pictures are exposed at least simultaneously are grouped around the picture changes.

In the method according to the invention, an additional picture of each of the cameras may only be exposed once. Both of the at least two consecutive pictures of each of the camera, however, are exposed at the at least two points in time at the inner-picture interval in time.

In the method according to the invention, each of the at least two consecutive pictures of each camera is exposed at at least two points in time at an inner-picture interval in time, which is at least two times, five times or even ten time an inter-picture interval at which the first point in time of exposing the later picture follows to the last point in time of exposing the prior of the at least consecutive pictures. In other words, the first point in time of exposing the later picture follows to the last point in time of exposing the prior picture at the inter-picture interval of time of not more than 50% of the inner-picture intervals of times of both the prior and the later picture. Thus, with a sequence of multiple exposed pictures recorded with the cameras, the at least two points in time at which the pictures are exposed are close in time to the picture changes between the consecutive pictures and thus to the associated short dead times of the cameras.

The short inter-picture intervals have the effect that the objects may not have moved far between the associated points in time of exposing the pictures of the cameras so that a simple interrelation of the associates real positions in the three-dimensional space is possible. The real positions at the respective points in time arranged at a longer interval in time may not be as easily interrelated to determine the trajectory of the respective object. The longer distances of these real positions of the objects, however, allow for a more precise determination of the velocities of the objects and, with determining several velocities from several real positions along each trajectory, also of the accelerations of the objects.

As already mentioned above, the method according to the invention is particularly suitable for determining velocities and accelerations of the individual objects and for determining velocity fields, acceleration fields and pressure fields of a flow with which the objects move from the trajectories of the objects. For the latter determinations, the objects may be seeded into the flow at a suitable seeding density. If the objects then have a mass density similar to the fluid density they will closely follow the flow when the pictures of the particles are recorded. The objects may be objects with which flows are usually seeded to measure them optically. Both in flowing gases and in flowing liquids, these objects include solid particles, fine droplets of liquids and fine gas bubbles.

The pictures of the cameras may be exposed by opening a shutter of the respective camera. In principle, the shutter may be a mechanical shutter. Electronic shutters may be controlled and opened faster and particularly at a higher frequency. Very quickly consecutive points in time of exposing the pictures of the cameras, however, are preferably not realized by a shutter but in that the objects are illuminated with short light pulses at the respective points in time, the intensity of the light pulses being sufficient for imaging the objects within the short times of illumination. For example, laser light pulses provided by lasers with a sufficiently high output power are suitable for this purpose. Here, it proves to be advantageous that many commercially available lasers may be operated at least two times at a short interval in time for outputting a laser light pulse of high light power. Instead of lasers, however, LEDs and LED arrays may also be used as light sources for providing suitable light pulses. Other light sources, like for example laser diodes, may also be used.

From the images of the individual objects in the pictures of the cameras which have been exposed simultaneously at the at least two points in time, the distribution of the real positions of the individual objects in the three-dimensional space may be determined by triangulation. The distribution of the positions of the individual objects in the three-dimensional space will then be the basis for interrelating the real positions to determine trajectories of the individual objects.

Alternatively, the distribution of the real positions of the individual objects in the three-dimensional space may be determined tomographically from the pictures of the cameras which have been exposed simultaneously at the at least two points in time, like it is, for example, known from US patent application publication US 2005/0062954 A1 and the corresponding U.S. Pat. No. 7,382,900.

The result of such a tomographic analysis of the simultaneously exposed pictures may more precisely be designated as a density distribution of the objects over the voxels of a measurement volume. If in the present description real positions of the objects in the three-dimensional space are mentioned, this shall, however, always include the possibility that these real positions in the three-dimensional space are described as a density distribution of the objects over voxels of a measurement volume.

A further, advantageous procedure of determining the distribution of the real positions of the individual objects in the three-dimensional space includes adapting an estimated distribution of the real positions of the individual objects in the three-dimensional space to their images in the pictures of the cameras which have been exposed simultaneously. This procedure is, for example, known from DE 10 2009 009 551 B4 (corresponding to U.S. Pat. No. 8,542,882 B2) or WO 2014/191461 A1 (corresponding to U.S. Pat. No. 9,733,267 B2). It is, however, to be understood that the estimated distribution has to include one position for each of the individual objects and for each time of exposure of the respective picture. This means, with two illuminations of the simultaneously exposed pictures, the distribution has to have twice as many real positions than individual objects, as each individual object is imaged at two points in time and thus at two positions if it has moved between the consecutive exposures of the pictures.

In so far as the teaching of WO 2014/191461 A1 (corresponding to U.S. Pat. No. 9,733,267 B2) is applied in carrying out the present invention, the estimated distribution for a set of simultaneously exposed pictures of the cameras may be estimated from a distribution which has been determined from the images of the individual objects in other pictures of the cameras which have been exposed at at least two other points in time, or from a momentary distribution determined for one point in time at which further pictures have been exposed only once. This step of estimating may include a step of extrapolating the real positions of the individual objects in the three-dimensional space along the trajectories of the individual objects in the three-dimensional space for the at least two points in time. This also provides for a basis for the step of continuously interrelating the real positions to determine the trajectories of the individual objects in the space.

The step of interrelating the real positions of the individual objects to determine their trajectories may further or instead also be based on a calculation of an auto-correlation function of each of the distributions of the real positions of the individual objects in the three-dimensional space which has been determined from the images of the objects in the pictures multiple exposed at the at least two points in time. Correspondingly, a cross-correlation function of two distributions of the real positions of the individual objects in the three-dimensional space, which have been determined from the images of the objects in the at least two consecutive pictures, may be calculated to interrelate the different positions of each respective object at the points in time of exposure of the at least two consecutive pictures of each camera.

Now referring in greater detail to the drawings, a measurement arrangement 1 depicted in FIG. 1 includes at least two cameras 2 and 3. The cameras 2 and 3 each have an objective lens 4 and a picture sensor 5. Each of the objective lenses 4 images a measurement volume 6 monitored by the two cameras 2 and 3 in an imaging direction 7 corresponding to the optical axis 8 of the respective objective lens 4 onto the respective picture sensor 5. In the measurement volume 6, there is a plurality of objects 9 which have been seeded into a (schematically indicated) flow 10 and which move with the flow 10. The cameras 2 and 3 are electronic cameras in which the picture sensors 5 picture by picture integrate and output incident light. The cameras 2 and 3 are synchronized, i.e. changes between the pictures of the cameras 2 and 3 occur simultaneously at least in so far that the pictures of the different cameras 2 and 3 are always exposed simultaneously.

The pictures of the cameras 2 and 3 are exposed by illuminating the objects 9 in the measurement volume 6 by means of a light source 11. In the present embodiment, the light source 11, besides two pulsed lasers 12 and a projection lens 14, includes two light guides 13. Instead of the two light guides 13, a polarization beam splitter may be used for merging the laser light from the two lasers 12 in front of the projection lens 14. In this case, the laser light from the two lasers 12 will be polarized differently. The lasers 12 are alternately controlled or operated such that the objects 9 are illuminated by light pulses. The pictures of the cameras 2 and 3 are exposed by that light of the light pulses that is reflected by the objects 9. As the measurement volume 6 is otherwise not illuminated, the pictures of the cameras 2 and 3 are only exposed at the points in time of the light pulses from the lasers 12. In principle, one laser 12 would be sufficient for the light source 11. Due to the second laser 12, however, it is easier to illuminate the measurement volume 6 twice in quick succession each time with a light pulse of high intensity from one of the two lasers 12.

From the images of the objects 9 in the pictures recorded by the picture sensors 5 which show the measurement volume 6 out of the different imaging directions 7, the real positions of the objects 9 in the measurement volume 6 are determined. As already explained above, this determination may be carried out in different ways.

Figure 2A:
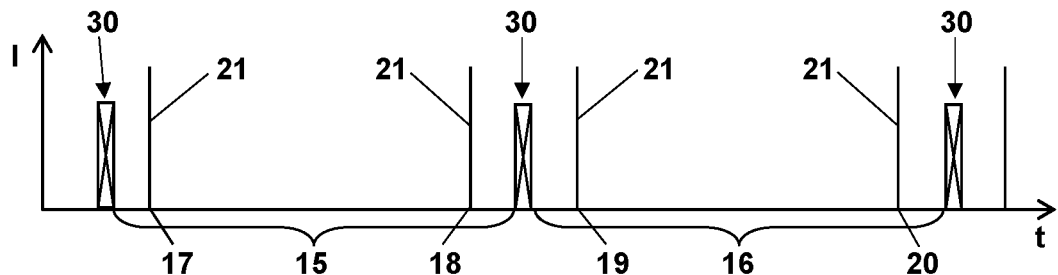
FIG. 2A and FIG. 2B illustrate different temporal successions of light pulses for illuminating the plurality of objects according to FIG. 1 to expose successive pictures of the cameras.

FIG. 2A shows a sequence of two light integration periods of time 15 and 16 of the cameras 2 and 3 according to FIG. 1 which are separated by a picture change 30 of the picture sensors 5 according to FIG. 1. Within each of the two light integration periods of time 15 and 16 the light incident on the picture sensors 5 is integrated to record one of two consecutive pictures. Each of these pictures is exposed at two points in time 17 and 18, and 19 and 20, respectively, for a short time in that the objects 9 in the measurement volume 6 are illuminated by one light pulse 21 from the one or the other of the two lasers 12. The points in time 17, 18, 19 and 20 of the light pulses 21 are arranged at long inner-picture intervals of time within the respective light integration period of time 15 or 16 but at short inter-picture intervals of time from light integration period of time 15 to light integration period of time 16. The more densely arranged light pulses 21 result in more densely arranged real positions of the objects 9 in the measurement volume 6 than light pulses 21 at longer intervals in time. More densely arranged real positions of the objects 9 in the measurement volume 6 may be more easily assigned to an individual object than real positions further apart from each other. The latter ones, however, allow for a more precise determination of the velocities of the respective object between the real positions.

Figure 2B:
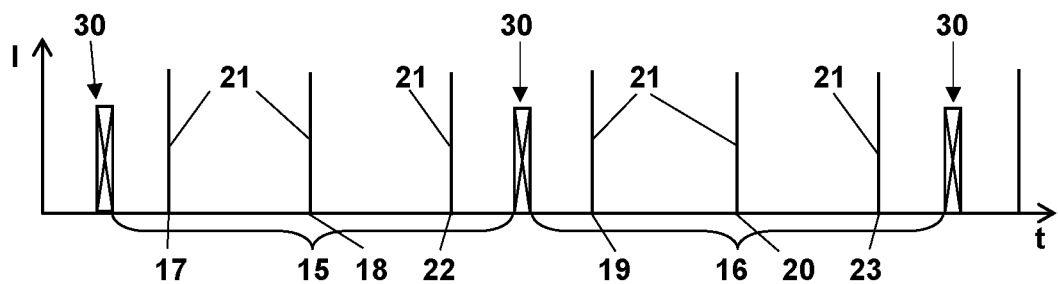

FIG. 2B shows a third light pulse 21 in the light integration period of time 15 at a point in time 22 and a third light pulse 21 in the light integration period of time 16 at a point in time 23. All light pulses 21 and the associated points in time 17, 18, 22, 19, 20 and 23 are arranged at equal intervals in time. Correspondingly, the real position of the objects 9 in the measurement volume 6 at the times 17, 18, 22, 19, 20, 23 are also arranged at equal intervals provided that the objects 9 uniformly move through the measurement volume 6. Generally, even more light pulses 21 may fall into each of the light integration periods of time 15 and 16. Further, different numbers of light pulses 21 may be directed onto the measurement volume 6 in the consecutive light integration periods of time 15 and 16.

Even if the light integration periods of time 15 and 16 in FIG. 2A and FIG. 2B each extend over the entire interval of time of the consecutive picture changes 30, they may be concentrated to shorter intervals of time including the points in time 17, 18 and 22 (if present), and 19, 20 and 23 (if present), respectively. The light integration periods of time 15 and 16 could also be interrupted between the points in time 17 and 18 and 22 (if present), and 19, 20 and 23 (if present), respectively, to minimize the light registered outside of the desired illumination of the pictures at the points in time 17, 18 and 22 (if present), and 19, 20 and 23 (if present), respectively.

Figure 3A:
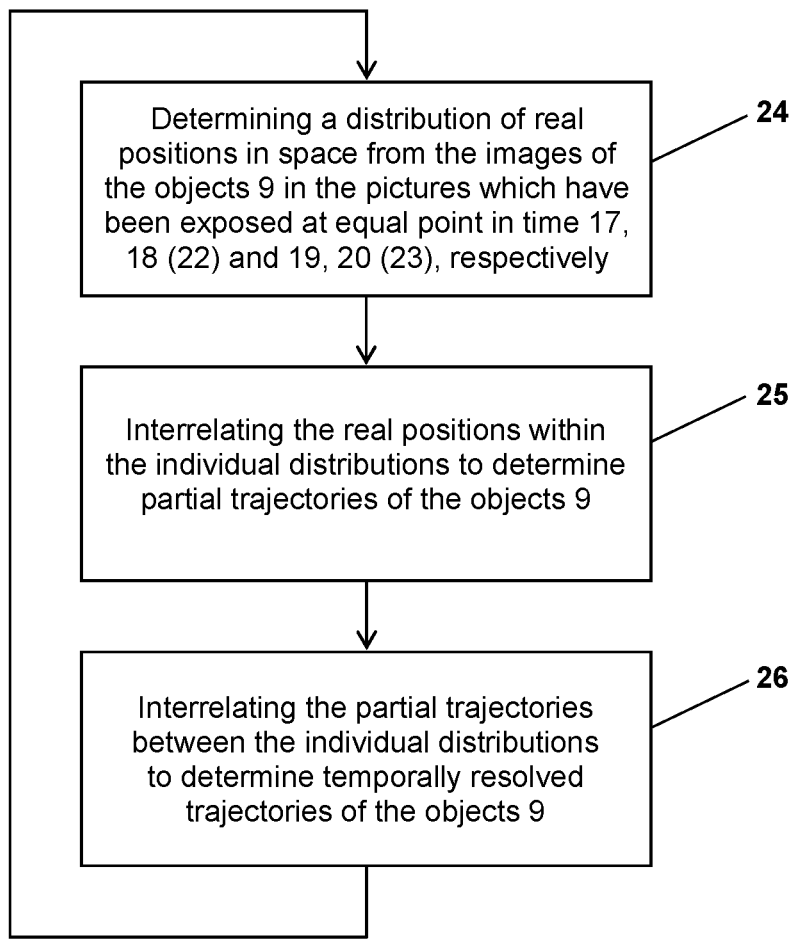

The flow chart according to FIG. 3A illustrates the evaluation of the pictures of the measurement volume 6 recorded with the cameras 2 and 3 according to FIG. 1 in a method according to the invention for intervals in time between the light pulses as depicted in FIG. 2A. In a step 24, the distribution of the real position in the space of the measurement volume 6 is determined from the images of the objects 9 in the respective simultaneously exposed pictures. Then, in a step 25, the real positions within each of the distributions are interrelated to determine trajectories of the objects 9. In a step 26, these trajectories of the objects are also interrelated between the distributions, resulting in temporally resolved trajectories of the objects 9. By only considering the real positions or the trajectories interrelating these real positions determined from the images of the objects 9 in the respective sets of simultaneously exposed pictures, the temporal sequence of these real positions, i.e. the direction of movement of the individual objects 9 along their trajectories, may not yet be determined. On the other hand, the trajectories of the objects 9 determined at a temporal resolution in step 26 may be used to enhance the determination of the real positions to the images of the objects 9 in step 24, as it is for example known from WO 2014/191461 A1. Further, the evaluation may take place over many consecutive pictures of each camera 2 and 3 not only in their real temporal sequence but also in opposite temporal direction to adapt the trajectories of the individual objects 9 to their images in the pictures of the measurement volume 6 to a maximum extent, i.e. to make a maximum use of the information included in these pictures.

Figure 3B:
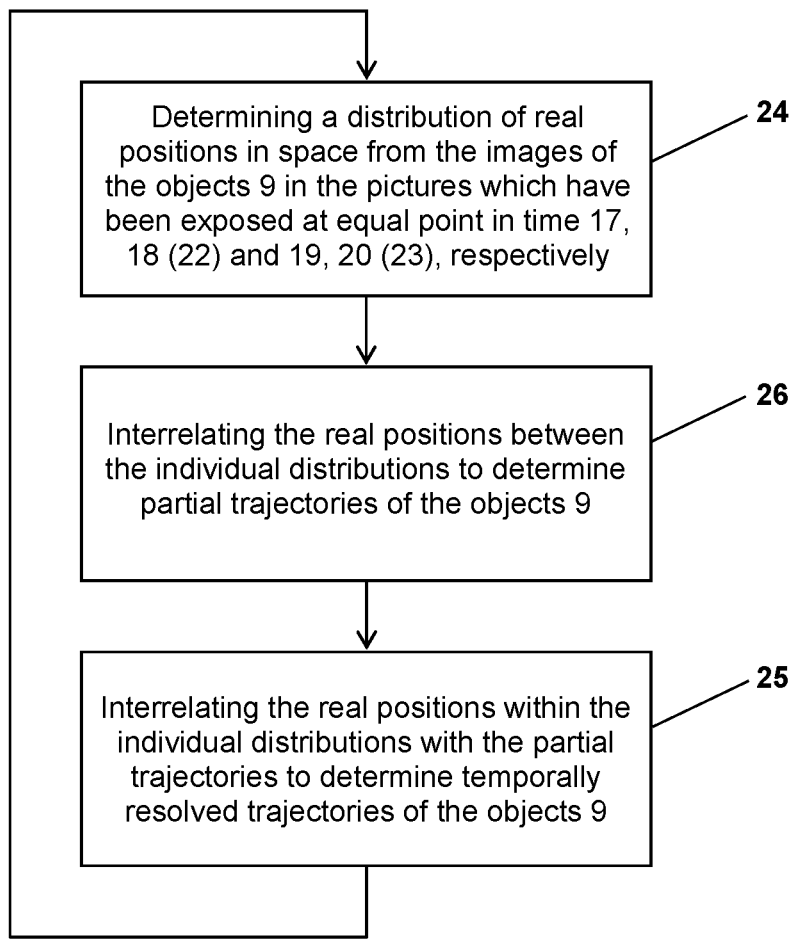

The flow chart according to FIG. 3B is related to an advantageous alternative evaluation of the pictures of the measurement volume 6 for inner-picture and inter-picture intervals in time between the light pulses 21 as depicted in FIG. 2 (a). The steps 25 and 26 are changed in sequence as compared to FIG. 3A. Due to the short inter-picture interval in time between the real positions at the points in time 18 and 19, at first the real positions of the individual objects at these points in time are interrelated to determine temporarily resolved partial trajectories of the individual objects 9 followed by an extension of these trajectory to the real positions at the points in time 17 of the prior illumination of the first picture during the first light integration period of time 15 and the real position at the time 20 of the later illumination of the second picture during the second light integration period of time 16.

In the method according to the invention, no positions of images of the objects 9 in the pictures recorded with picture sensors 5 are interrelated. Instead the real positions of the objects 9 in the three-dimensional space determined from these images are interrelated. This has to be considered when looking at FIG. 4 which shows the projections of real positions of an object 9 in the three-dimensional space at the points in time 17 to 20 according to FIG. 2A on an x-y plane. According to FIG. 2A, the points in time 17 and 18 on the one hand and 19 and 20 on the other hand are closer to each other than the points in time 18 and 19. At the two points in time 17 and 18, the first picture of each of the cameras 2 and 3 is exposed during the light integration period of time 15. Correspondingly, the positions of the object at the points in time 17 and 18 belong to a distribution 27 of real positions indicated in FIG. 4A which has been determined from the images of the objects 9 in these pictures. On the other hand, the positions of the objects at the periods of time 19 and 20 belong to a distribution 28 of real positions determined from the images of the objects 9 in the following pictures of each of the cameras, see FIG. 4B. Each of these distributions 27 and 28 thus only includes a part of the trajectory 29 of the objects examined, wherein the direction of the trajectory 29 is not yet defined. Only when interrelating the two distributions 27 and 28 as indicated in FIG. 4C, the trajectory 29 of the respective object will be completely reconstructed, i.e. inclusive of its chronology, i.e. its direction. Here, the real positions of the objects along the trajectory 29 or their distances are a measure of the velocity of the object. Changing velocities mean accelerations of the object. By considering a multitude of objects, it is possible to also conclude on the density of the objects and thus also on the density or the pressure of the respective flow 10.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of tracking a plurality of point-shaped objects in a three-dimensional space, the method comprising
    recording two-dimensional pictures of the plurality of objects by means of at least two black and white cameras out of at least two different imaging directions;
        wherein at least first and second pictures of the at least two black and white cameras are each exposed at at least two points in time in equal ways in that the objects are illuminated with short light pulses at the at least two points in time,
        wherein the first pictures are exposed simultaneously for a first time at a first point in time of a first light pulse of the short light pulses and for a last time at a second point in time of a second light pulse of the short light pulses following to the first point in time of the first light pulse of the short light pulses at a first inner-picture interval of time,
        wherein the second pictures are exposed simultaneously for a first time at a third point in time of a third light pulse of the short light pulses and for a last time at a fourth point in time of a fourth light pulse of the short light pulses following to the third point in time of the third light pulse of the short light pulses at a second inner-picture interval of time, and
        wherein the third point in time of the third light pulse of the short light pulses follows to the second point in time of the second light pulse of the short light pulses at an inner-picture interval of time of not more than 50% of the first inner-picture interval of time and of not more than 50% of the second inner-picture interval of time;
    determining a first distribution and a second distribution of real positions of the individual objects of the plurality of objects in the three-dimensional space from their images in the first pictures and from their images in the second pictures, respectively,
        wherein at least the first or the second distribution of the real positions of the individual objects of the plurality of objects in the three-dimensional space is determined from the images of the individual objects of the plurality of objects in the first or second pictures, respectively, in that an estimated distribution of the real positions of the individual objects in the three-dimensional space is adapted to their images in the first or second pictures, respectively; and
    determining temporally resolved trajectories of the individual objects of the plurality of objects in the three-dimensional space from the determined first and second distributions of the real positions of the individual objects,
        wherein different real positions of the same individual objects of the plurality of objects in the first distribution are interrelated,
        wherein different real positions of the same individual objects of the plurality of objects in the second distribution are interrelated, and
        wherein different real positions of the same individual objects of the plurality of objects in the first and second distributions are interrelated.

2. The method of claim 1, wherein the inter-picture interval of time at which the third point in time follows to the second point in time is not more than 20% of the first inner-picture interval of time and of not more than 20% of the second inner-picture interval of time.

3. The method of claim 2, wherein the inter-picture interval of time at which the third point in time follows to the second point in time is not more than 10% of the first inner-picture interval of time and of not more than 10% of the second inner-picture interval of time.

4. The method of claim 1, wherein the different real positions of the same individual objects of the plurality of objects in the first distribution and in the second distribution are interrelated between the first and second distributions, before the different real positions of the same individual objects of the plurality of objects in the first distribution are interrelated within the first distribution and the different real positions of the same individual objects of the plurality of objects in the second distribution are interrelated within the second distribution.

5. The method of claim 1, wherein third pictures of the at least two black and white cameras are each exposed at at least two points in time in equal ways, wherein the third pictures are exposed simultaneously for a first time at a fifth point in time and for a last time at a sixth point in time following to the fifth point in time at a third inner-picture interval of time, wherein the fifth point in time follows to the fourth point in time at the inter-picture interval of time of not more than 50% of the first inner-picture interval of time, of not more than 50% of the second inner-picture interval of time and of not more than 50% of the third inner-picture interval of time.

6. The method of claim 1, wherein at least one of
    velocities of the individual objects of the plurality of objects, and
    accelerations of the individual objects of the plurality of objects are determined from the temporally resolved trajectories of the individual objects of the plurality of objects.

7. The method of claim 1, wherein at least one of
a velocity field of a flow with which the individual objects of the plurality of objects move,
an acceleration field of a flow with which the individual objects of the plurality of objects move, and
a pressure field of a flow with which the individual objects of the plurality of objects move
are determined from the temporally resolved trajectories of the individual objects of the plurality of objects.

8. The method of claim 1, wherein the pictures of the black and white cameras are exposed at the at least two points in time in that the objects of the plurality of objects are illuminated by light pulses.

9. The method of claim 1, wherein the estimated distribution of the real positions of the individual objects in the three-dimensional space is an object distribution of all of the individual objects in the three-dimensional space for which trajectories in the three-dimensional space have been determined before.

10. The method of claim 1, wherein the estimated distribution of the real positions of the individual objects in the three-dimensional space is estimated by extrapolating a starting distribution of the individual objects in the three-dimensional space along the trajectories of the individual objects in the three-dimensional space for the at least two points in time at which the respective first or second pictures are exposed.

11. The method of claim 10, wherein the starting distribution is
a distribution which has been determined from images of the individual objects of the plurality of objects in other pictures of the black and white cameras which have been exposed at least two other points in time, or
a momentary distribution of the real positions of the individual objects of the plurality of objects in the three-dimensional space which has been determined from images of the individual objects of the plurality of objects in other pictures of the black and white cameras which have been exposed at one other point in time.

12. The method of claim 1, wherein an auto-correlation function of at least the first or the second distribution of the real positions of the individual objects of the plurality of objects in the three-dimensional space is calculated to interrelate the different real positions of the same individual objects of the plurality of objects in the first or the second distribution, respectively.

13. The method of claim 1, wherein a cross-correlation function of the first and the second distributions of the real positions of the individual objects of the plurality of objects in the three-dimensional space is calculated to interrelate the different real positions of the same individual objects of the plurality of objects in the first and second distributions.

14. A method of tracking a plurality of point-shaped objects in a three-dimensional space, the method comprising
recording two-dimensional pictures of the plurality of objects by means of at least two black and white cameras out of at least two different imaging directions;
wherein at least first and second pictures of the at least two black and white cameras are each exposed at at least two points in time in equal ways in that the objects are illuminated with short light pulses at the at least two points in time,
wherein the first pictures are exposed simultaneously for a first time at a first point in time of a first light pulse of the short light pulses and for a last time at a second point in time of a second light pulse of the short light pulses following to the first point in time of the first light pulse of the short light pulses at a first inner-picture interval of time,
wherein the second pictures are exposed simultaneously for a first time at a third point in time of a third light pulse of the short light pulses and for a last time at a fourth point in time of a fourth light pulse of the short light pulses following to the third point in time of the third light pulse of the short light pulses at a second inner-picture interval of time, and
wherein the third point in time of the third light pulse of the short light pulses follows to the second point in time of the second light pulse of the short light pulses at an inner-picture interval of time of not more than 50% of the first inner-picture interval of time and of not more than 50% of the second inner-picture interval of time;
determining a first distribution and a second distribution of real positions of the individual objects of the plurality of objects in the three-dimensional space from their images in the first pictures and from their images in the second pictures, respectively,
wherein at least the first or the second distribution of the real positions of the individual objects of the plurality of objects in the three-dimensional space is determined from the images of the individual objects of the plurality of objects in the first or second pictures, respectively, in that an estimated distribution of the real positions of the individual objects in the three-dimensional space is adapted to their images in the first or second pictures, respectively, and
wherein the estimated distribution of the real positions of the individual objects in the three-dimensional space is an object distribution of all of the individual objects in the three-dimensional space for which trajectories in the three-dimensional space have been determined before; and
determining temporally resolved trajectories of the individual objects of the plurality of objects in the three-dimensional space from the determined first and second distributions of the real positions of the individual objects,
wherein different real positions of the same individual objects of the plurality of objects in the first distribution are interrelated,
wherein different real positions of the same individual objects of the plurality of objects in the second distribution are interrelated, and
wherein different real positions of the same individual objects of the plurality of objects in the first and second distributions are interrelated.

15. A method of tracking a plurality of point-shaped objects in a three-dimensional space, the method comprising
recording two-dimensional pictures of the plurality of objects by means of at least two black and white cameras out of at least two different imaging directions;
wherein at least first and second pictures of the at least two black and white cameras are each exposed at at least two points in time in equal ways in that the objects are illuminated with short light pulses at the at least two points in time,
wherein the first pictures are exposed simultaneously for a first time at a first point in time of a first light pulse of the short light pulses and for a last time at a second point in time of a second light pulse of the short light pulses following to the first point in time of the first light pulse of the short light pulses at a first inner-picture interval of time, wherein the second pictures are exposed simultaneously for a first time at a third point in time of a third light pulse of the short light pulses and for a last time at a fourth point in time of a fourth light pulse of the short light pulses following to the third point in time of the third light pulse of the short light pulses at a second inner-picture interval of time, and wherein the third point in time of the third light pulse of the short light pulses follows to the second point in time of the second light pulse of the short light pulses at an inner-picture interval of time of not more than 20% of the first inner-picture interval of time and of not more than 20% of the second inner-picture interval of time;

determining a first distribution and a second distribution of real positions of the individual objects of the plurality of objects in the three-dimensional space from their images in the first pictures and from their images in the second pictures, respectively; and determining temporally resolved trajectories of the individual objects of the plurality of objects in the three-dimensional space from the determined first and second distributions of the real positions of the individual objects, wherein different real positions of the same individual objects of the plurality of objects in the first distribution are interrelated, wherein different real positions of the same individual objects of the plurality of objects in the second distribution are interrelated, and wherein different real positions of the same individual objects of the plurality of objects in the first and second distributions are interrelated.

16. The method of claim 15, wherein at least the first or the second distribution of the real positions of the individual objects of the plurality of objects in the three-dimensional space is determined by triangulation from the images of the individual objects of the plurality of objects in the first or second pictures, respectively.

17. The method of claim 15, wherein at least the first or the second distribution of the real positions of the individual objects of the plurality of objects in the three-dimensional space is tomographically determined from the images of the individual objects of the plurality of objects in the first or second pictures, respectively.

18. The method of claim 15, wherein at least the first or the second distribution of the real positions of the individual objects of the plurality of objects in the three-dimensional space is determined from the images of the individual objects of the plurality of objects in the first or second pictures, respectively, in that an estimated distribution of the real positions of the individual objects in the three-dimensional space is adapted to their images in the first or second pictures, respectively.

* * * * *